United States Patent
Rajendra Zanpure et al.

(10) Patent No.: US 10,793,150 B2
(45) Date of Patent: Oct. 6, 2020

(54) METHOD AND DEVICE FOR CONTROLLING VEHICLE BASED ON NEIGHBORING VEHICLES

(71) Applicant: WIPRO LIMITED, Bangalore (IN)

(72) Inventors: Chaitanya Rajendra Zanpure, Pune (IN); Shivam Mishra, Ghaziabad (IN)

(73) Assignee: Wipro Limited, Bangalore (IN)

( * ) Notice: Subject to any disclaimer, the term of this patent is extended or adjusted under 35 U.S.C. 154(b) by 168 days.

(21) Appl. No.: 16/174,441

(22) Filed: Oct. 30, 2018

(65) Prior Publication Data

US 2020/0086864 A1 Mar. 19, 2020

(30) Foreign Application Priority Data

Sep. 14, 2018 (IN) .............................. 201841034804

(51) Int. Cl.
| | | |
|---|---|---|
| *B60W 30/095* | (2012.01) | |
| *G06T 7/70* | (2017.01) | |
| *H04W 4/46* | (2018.01) | |
| *H04W 4/44* | (2018.01) | |
| *B60W 30/09* | (2012.01) | |

(Continued)

(52) U.S. Cl.
CPC ........ *B60W 30/0956* (2013.01); *B60W 30/09* (2013.01); *G05D 1/0088* (2013.01); *G06T 7/20* (2013.01); *G06T 7/70* (2017.01); *H04W 4/44* (2018.02); *H04W 4/46* (2018.02);

(Continued)

(58) Field of Classification Search
CPC ......... B60W 2420/40; B60W 2420/42; B60W 2420/52; B60W 2420/54; B60W 2520/06; B60W 2520/10; B60W 2554/00; B60W 2554/80; B60W 2556/65; B60W 2720/10; B60W 2720/24; B60W 30/08; B60W 30/09; B60W 30/0956; B60W 30/143; G05D 1/0088; G06K 9/00791; G06K 9/3216; G06T 2207/30261; G06T 7/20; G06T 7/70; H04W 4/44; H04W 4/46
See application file for complete search history.

(56) References Cited

U.S. PATENT DOCUMENTS

| | | | | |
|---|---|---|---|---|
| 6,690,294 B1 * | 2/2004 | Zierden | ................... | G08G 1/052 340/933 |
| 7,049,945 B2 * | 5/2006 | Breed | ..................... | G01S 17/89 340/435 |

(Continued)

*Primary Examiner* — Babar Sarwar
(74) *Attorney, Agent, or Firm* — Finnegan, Henderson, Farabow, Garrett & Dunner, LLP

(57) ABSTRACT

A method and device for controlling a vehicle based on neighboring vehicles is disclosed. The method includes identifying a fiduciary object associated with each of at least one neighboring vehicle based on at least one image captured for the at least one neighboring vehicle. The method further includes tracking a position of the fiduciary object associated with each of the at least one neighboring vehicle based on a bounding box surrounding the fiduciary object. The method includes determining a direction-speed vector for the vehicle and determining trajectory data associated with each of the one or more neighboring vehicles. The method further includes correlating the position of the fiduciary object and the trajectory data associated with each of the at least one neighboring vehicle. The method includes re-computing the direction-speed vector of the vehicle based on a result of correlating and controlling the vehicle thereafter.

19 Claims, 12 Drawing Sheets

(51) Int. Cl.
*G05D 1/00* (2006.01)
*G06T 7/20* (2017.01)

(52) U.S. Cl.
CPC ..... *B60W 2554/80* (2020.02); *B60W 2556/65* (2020.02); *G06T 2207/30261* (2013.01)

(56) References Cited

U.S. PATENT DOCUMENTS

| | | | | |
|---|---|---|---|---|
| 8,736,463 | B1* | 5/2014 | Zhu | G06K 9/00791 |
| | | | | 340/933 |
| 8,874,267 | B1* | 10/2014 | Dolgov | G01C 21/26 |
| | | | | 700/255 |
| 2008/0285799 | A1* | 11/2008 | Chiu | G06T 7/97 |
| | | | | 382/103 |
| 2009/0017765 | A1* | 1/2009 | Lev | G06K 9/228 |
| | | | | 455/66.1 |
| 2009/0207248 | A1* | 8/2009 | Cilia | H04N 19/17 |
| | | | | 348/143 |
| 2015/0235092 | A1* | 8/2015 | Mei | G06T 7/277 |
| | | | | 382/103 |
| 2015/0246672 | A1* | 9/2015 | Pilutti | B60W 30/00 |
| | | | | 701/2 |
| 2017/0066445 | A1* | 3/2017 | Habu | B62D 15/026 |
| 2017/0316694 | A1* | 11/2017 | Ryu | G08G 1/166 |
| 2017/0334453 | A1* | 11/2017 | Mimura | B60W 30/12 |
| 2018/0229724 | A1* | 8/2018 | Gutmann | G06K 9/3233 |
| 2019/0072965 | A1* | 3/2019 | Zhang | G08G 1/167 |
| 2019/0072966 | A1* | 3/2019 | Zhang | G08G 1/166 |
| 2019/0317517 | A1* | 10/2019 | Boulton | B60W 40/04 |

\* cited by examiner

METHOD AND DEVICE FOR CONTROLLING VEHICLE BASED ON NEIGHBORING VEHICLES

TECHNICAL FIELD

This disclosure relates generally to automatically controlling vehicles and more particularly to a method and device for automatically controlling vehicle based on neighboring vehicles.

BACKGROUND

While driving a vehicle on a road, the speed of the vehicle may be adjusted or controlled based on conditions of the road. However, currently, the information regarding the road conditions is limited to the road being single lane, the road being double lane, location of a divider on the road, curves or turns on the road, maximum speed limit for the road, or traffic data associated with the road. However, the information regarding various abnormalities or aberrations on the road, for example, the levelling or unevenness of the road, potholes on the road, stationary obstacles, or obstacles that suddenly appear (for example, an obstruction cause due to a fallen tree or pole) is not taken into account.

As a result of absence of such information, the conventional systems are not aware about the impending abnormalities or aberrations that a vehicle may encounter on a road. Thus, when a vehicle drives into an area where the road has above discussed abnormalities or aberrations, the vehicle may take an evasive action such as, changing the lane abruptly to avoid an abnormality, applying sudden brakes, or crossing or encountering the abnormality. In any of the above discussed scenarios, the passengers within vehicle may have a very unpleasant experience and the vehicle may also end up in an accident or may get damaged. The impact of such a problem is a major concern especially in the case autonomous or semi-autonomous vehicles.

Additionally, in the case of autonomous or semi-autonomous vehicles, correlating the data associated with fiduciary objects and the trajectory data of the neighboring vehicles is a major technical challenge. This is because the position of the fiduciary objects may constantly keep on changing and thus determining the correlation and then controlling the autonomous or semi-autonomous vehicles in real-time is not possible. State of the art systems fail to correlate the data associated with fiduciary objects and the trajectory data of the neighboring vehicles and further do not control the vehicle based on such correlation.

SUMMARY

In one embodiment, a method for controlling a vehicle based on neighboring vehicles is disclosed. The method includes identifying, by a vehicle controlling device, a fiduciary object associated with each of at least one neighboring vehicle based on at least one image captured for the at least one neighboring vehicle. The method further includes tracking, by the vehicle controlling device, a position of the fiduciary object associated with each of the at least one neighboring vehicle based on a bounding box surrounding the fiduciary object associated with each of at least one neighboring vehicle in the at least one image. The method includes determining, by the vehicle controlling device, a direction-speed vector associated with the vehicle based on direction of motion of the vehicle and speed of the vehicle. The method further includes determining, by the vehicle controlling device, trajectory data associated with each of the at least one neighboring vehicle. The method includes correlating, by the vehicle controlling device, the position of the fiduciary object and the trajectory data associated with each of the at least one neighboring vehicle. The method further includes re-computing, by the vehicle controlling device, the direction-speed vector of the vehicle based on a result of correlating. The method includes controlling, by the vehicle controlling device, the vehicle based on the re-computed direction-speed vector.

In another embodiment, a vehicle controlling device for controlling a vehicle based on neighboring vehicles is disclosed. The vehicle controlling device includes a processor and a memory communicatively coupled to the processor, the at least one first camera, and the at least one second camera, wherein the memory stores processor instructions, which, on execution, causes the processor to identify a fiduciary object associated with each of at least one neighboring vehicle based on at least one image captured for the at least one neighboring vehicle. The processor instructions further cause the processor to track a position of the fiduciary object associated with each of the at least one neighboring vehicle based on a bounding box surrounding the fiduciary object associated with each of at least one neighboring vehicle in the at least one image. The processor instructions cause the processor to determine a direction-speed vector associated with the vehicle based on direction of motion of the vehicle and speed of the vehicle. The processor instructions further cause the processor to determine trajectory data associated with each of the at least one neighboring vehicle. The processor instructions cause the processor to correlate the position of the fiduciary object and the trajectory data associated with each of the at least one neighboring vehicle. The processor instructions cause the processor to re-compute the direction-speed vector of the vehicle based on a result of correlating. The processor instructions further cause the processor to control the vehicle based on the re-computed direction-speed vector.

In yet another embodiment, a non-transitory computer-readable storage medium having stored thereon, a set of computer-executable instructions causing a computer including one or more processors to perform steps including identifying a fiduciary object associated with each of at least one neighboring vehicle based on at least one image captured for the at least one neighboring vehicle; tracking a position of the fiduciary object associated with each of the at least one neighboring vehicle based on a bounding box surrounding the fiduciary object associated with each of at least one neighboring vehicle in the at least one image; determining a direction-speed vector associated with the vehicle based on direction of motion of the vehicle and speed of the vehicle; determining trajectory data associated with each of the at least one neighboring vehicle; correlate the position of the fiduciary object and the trajectory data associated with each of the at least one neighboring vehicle; re-computing the direction-speed vector of the vehicle based on a result of correlating; and controlling the vehicle based on the re-computed direction-speed vector.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
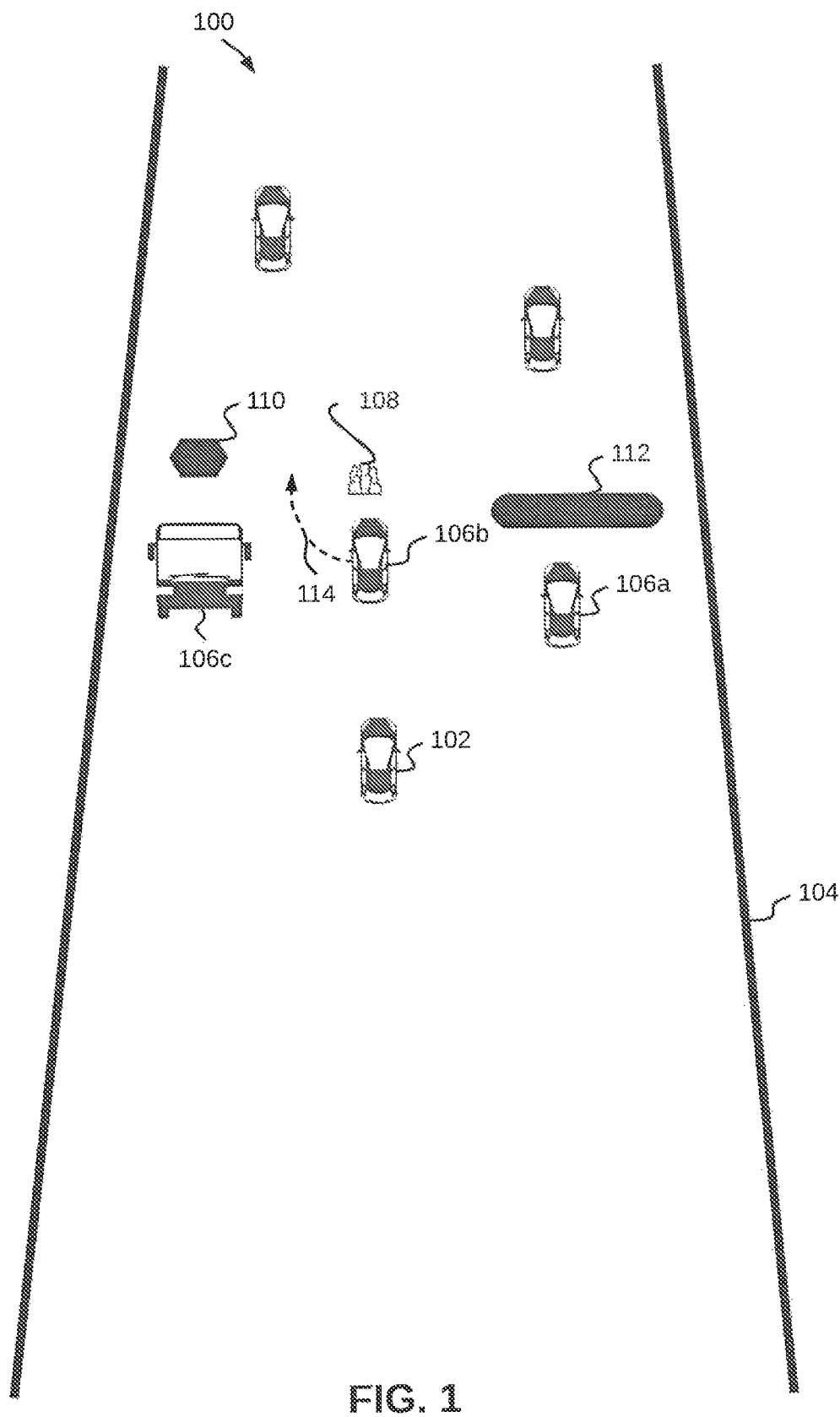
FIG. 1 illustrates an exemplary environment in which various embodiments may be employed.

Referring to FIG. 1, an exemplary environment 100 in which various embodiments may be employed, is illustrated. The environment 100 illustrates a vehicle 102 driving on a road 104. Examples of the vehicle 102 may include, but are not limited to a car, a van, a sports utility vehicle, a multi utility vehicle, a bus, a minibus, or a truck. The vehicle 102 may be an autonomous vehicle, a semi-autonomous vehicle, or a non-autonomous vehicle.

On the road 104, in addition to the vehicle 102, there may be a neighboring vehicle 106a, a neighboring vehicle 106b, and a neighboring vehicle 106c (collectively referred to as the plurality of neighboring vehicles 106) in vicinity of the vehicle 102. Each of the plurality of neighboring vehicles 106 may be autonomous, semi-autonomous, or non-autonomous. The vehicle 102 and the plurality of neighboring vehicles 106 may all be moving in the same direction. As depicted in FIG. 1, the vehicle 102 may be in motion behind each of the plurality of neighboring vehicles 106, such that, the vehicle 102 is on the same path as the neighboring vehicle 106b.

There may be various aberrations on the road 104, for example, an obstacle 108, a pothole 110, and a speed bump 112 as depicted in FIG. 1. Additionally, examples of the aberrations may include, but are not limited to unlevelled roads due to faulty construction or accidental damage, or bumps on the road resulting from melting of top layer because of heat. Examples of the obstacle 108 may include, but are not limited to, debris, a permanent structure, a tree, a human, or an accident site. The obstacle 108 may also suddenly appear in path of the vehicle 102 or one of the plurality of neighboring vehicles 106. As a result of these aberrations, driving experience of passengers inside the vehicle 102 may be adversely affected and maintaining a good driving experience for the passengers may become a challenge.

By way of an example, the neighboring vehicle 106b may be heading into the obstacle 108 and may either come to a sudden stop or may take a sharp detour 114 to avoid colliding with the obstacle 108. This may, not only cause injuries to passengers, but may also cause damage to the neighboring vehicle 106b. Similarly, the neighboring vehicle 106a may be heading into the speed bump 112 and the neighboring vehicle 106c may be heading into the pothole 110.

Figure 2:
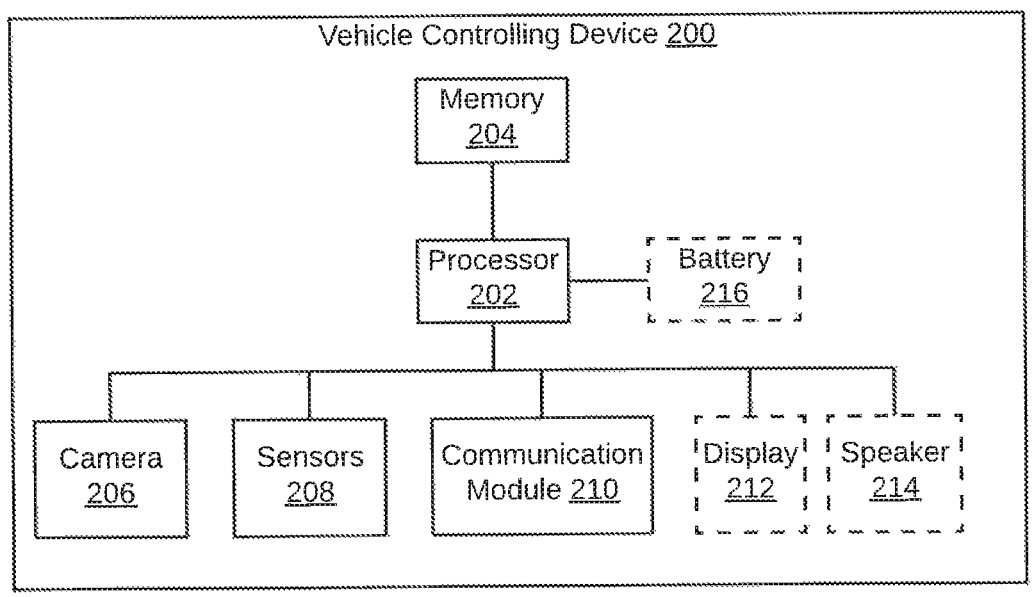
FIG. 2 illustrates a block diagram of a vehicle controlling device for controlling an autonomous vehicle, in accordance with an embodiment.

Referring now to FIG. 2, a block diagram of a vehicle controlling device 200 for controlling the vehicle 102 based on neighboring vehicles is illustrated, in accordance with an embodiment. The neighboring vehicles, for example, may be the plurality of neighboring vehicles 106. The vehicle controlling device 200 may be integrated within the vehicle 102. Alternatively, the vehicle controlling device 200 may be a mobile device that might be placed within the vehicle 102. In this case, examples of the vehicle controlling device 200 may include, but are not limited to a smart phone, a tablet, and a phablet. Additionally, when the vehicle controlling device 200 is a mobile device, it may communicate with the vehicle 102 via a network (not shown in FIG. 2). Examples of the network may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). The vehicle controlling device 200 may also be a remote server that may control the vehicle 102 from a remote location via the network discussed above.

The vehicle controlling device 200 includes a processor 202 that is coupled to a memory 204. The memory 204 stores instructions for the processor 202, which, on execution, causes the processor 202 to perform desired operations. The memory 204 may be a non-volatile memory or a volatile memory. Examples of the non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM). Various module in the memory 204 are further explained in detail in conjunction with FIG. 3.

The vehicle controlling device 200 further includes a camera 206 that captures images of one or more of the plurality of neighboring vehicles 106, that may be ahead of the vehicle 102. The camera 206, for example, may be a depth camera, an infrared light camera, a visible light camera, a light field camera, or a position tracking camera. The vehicle controlling device 200 may further include sensors 208 (for example, a Global Positioning System (GPS), a compass, a gyroscope, a 3D inclinometer, accelerometer, pressure sensor, heat sensor, ambient light sensor, a variometer, and/or a tactile sensor) that may capture various parameters of the vehicle 102. The vehicle controlling device 200 may also communicate with external sensors (not shown in FIG. 2) that are integrated within the vehicle 102 and capture trajectory information of the vehicle 102. The external sensors, for example, may include, but are not limited to Light Detection and Ranging (LiDAR), Radio Detection and Ranging (RADAR), Infra-Red (IR) sensor and/or ultrasonic sensors.

The vehicle controlling device 200 may communicate with the external sensors, one or more of the plurality of neighboring vehicles, and/or vehicle infrastructure access points, via a communication module 210, which may support multiple communication protocols. Examples of these communication protocols may include, but are not limited to WLAN, Wi-Fi, LTE, WiMAX, GPRS, Bluetooth, Zigbee, Infrared, NearBytes, Near Field Communication (NFC), or any other Vehicle to Vehicle (V2V) or Vehicle to Infrastructure (V2I) communication protocol.

To issue notifications or warnings, the vehicle controlling device 200 may also include a display 212 and a speaker 214 (coupled to the processor 202). The display 212 may be a touch screen that enables passengers to interact with the vehicle controlling device 200. The display 212, for example, may be a Plasma display, a Liquid Crystal Display (LCD), a Light Emitting Diode (LED) display, an Organic Light Emitting Diode (OLED) display, and an Active Matrix OLED (AMOLED) display. Lastly, the vehicle controlling device 200 may also include a battery 216 in order to work independent of a power source, when the vehicle controlling device 200 is a mobile device independent of the vehicle 102.

Figure 3:
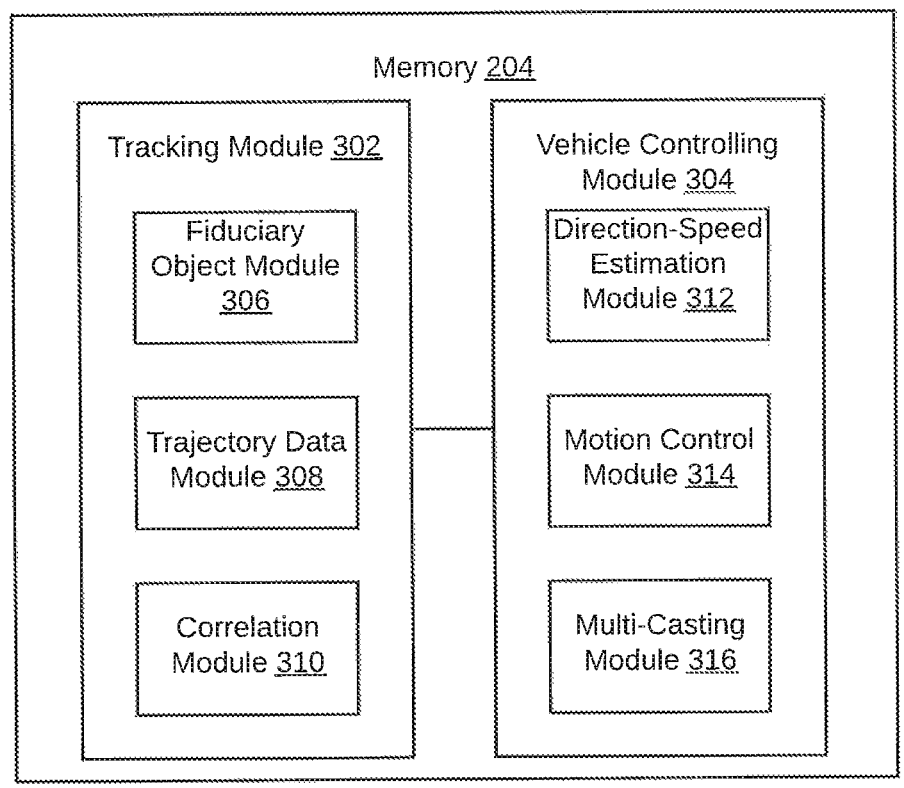
FIG. 3 illustrates a block diagram of various modules in a memory of a vehicle controlling device configured to control a vehicle based on neighboring vehicles, in accordance with an embodiment.

Various functionalities performed by the vehicle controlling device 200 are further explained in detail in conjunction with FIG. 3 illustrating various modules within the memory 204.

Referring now to FIG. 3, a block diagram of various modules within the memory 204 of the vehicle controlling device 200 that is configured to control the vehicle 102 based on neighboring vehicles is illustrated, in accordance with an embodiment. The memory 204 includes a tracking module 302 that identifies and tracks fiduciary objects in one or more of a plurality of neighboring vehicles and a vehicle controlling module 304 that controls the vehicle (for example, the vehicle 102) based on the identification and tracking performed by the tracking module 302.

The tracking module 302 further includes a fiduciary object module 306, a trajectory data module 308, and a correlation module 310. The vehicle controlling module 304 further includes a direction-speed estimation module 312, a motion control module 314, and a multi-casting module 316. The fiduciary object module 306 may be configured to analyze images captured by the camera 206, based on one or more image tracking and analysis techniques. Based on the tracking, the fiduciary object module 306 may be configured to determine a fiduciary object associated with a neighboring vehicle from the image captured for the neighboring vehicle. Once the fiduciary object is successfully determined, the fiduciary object module 306 may track the fiduciary object based on one or more bounding boxes enclosing the fiduciary object. This is further explained in detail in conjunction with FIG. 4 and FIG. 6.

The trajectory data module 308 may be configured to determine trajectory data of a plurality of neighboring vehicles in the vicinity of the vehicle (for example, the vehicle 102). The trajectory data associated with each of the one or more neighboring vehicles is determined based on one or more of, but not limited to LiDAR, Radar, IR sensing, and/or ultrasonic sensing. Such sensing techniques may be used in conjunction with Vehicle-to-vehicle (V2V) and Vehicle-to-infrastructure (V2I) communication protocols. For a neighboring vehicle, the trajectory data may include one or more of, lane change information associated with a neighboring vehicle, speed information associated with the neighboring vehicle, and vehicle infrastructure data associated with the neighboring vehicle. This is further explained in detail in conjunction with FIG. 4, FIG. 7, and FIGS. 8A, 8B, 8C, and 8D.

The direction-speed estimation module 312 determines a direction-speed vector associated with the vehicle based on direction of motion of the vehicle and speed of the vehicle. In other words, the direction-speed vector may be a resultant of the component of a vector that indicates the direction of motion of the vehicle and a vector that indicates the speed of the vehicle. Thereafter, the correlation module 310 correlates the position of the fiduciary object, the trajectory data associated with each of the plurality of neighboring vehicles, and the direction-speed vector associated with the vehicle. Based on the trajectory data received for a neighboring vehicle, the vehicle controlling device 200 may associate a first vector with lane change information of the neighboring vehicle, a second vector with speed information of the neighboring vehicle, and a third vector with vehicle infrastructure data associated with all neighboring vehicles. Further, a fourth vector may be associated with the direction-speed vector determined for the vehicle. This is further explained in detail in conjunction with FIG. 4, FIG. 7, and FIGS. 8A, 8B, 8C, and 8D.

Based on a result of the correlating, the motion control module 314 re-computes the direction-speed vector of the vehicle (for example, the vehicle 102). Based on the re-computed direction-speed vector for the vehicle, the motion control module 314 controls the vehicle. Controlling the vehicle may include controlling the speed and the direction of motion of the vehicle. This is further explained in detail in conjunction with FIG. 4 and FIG. 7. The multi-casting module 316 may then multi-cast the re-computed direction-speed vector, via the communication module 210, to a set of neighboring vehicles from the plurality of neighboring vehicles.

Figure 4:
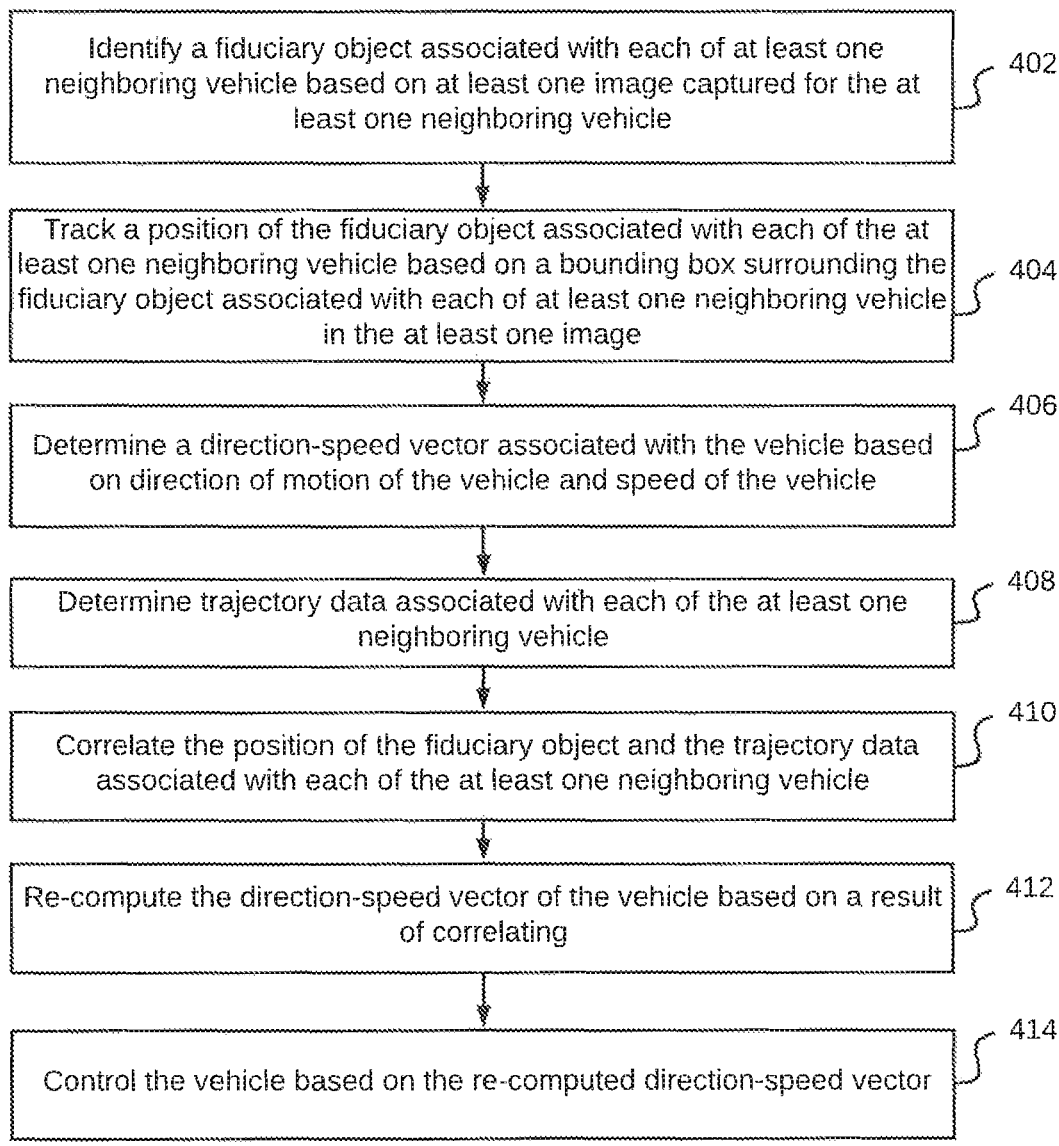
FIG. 4 illustrates a flowchart of a method for controlling a vehicle based on neighboring vehicles, in accordance with an embodiment.

Referring now to FIG. 4, a flowchart of a method for controlling a vehicle based on neighboring vehicles is illustrated, in accordance with an embodiment. The vehicle, for example, may be the vehicle 102. At step 402, the vehicle controlling device 200 associated with the vehicle, identifies a fiduciary object associated with each of one or more neighboring vehicles, based on one or more images captured for the one or more neighboring vehicles. The vehicle controlling device 200 associated with the vehicle may capture the one or more images. By way of an example, the vehicle controlling device 200 of the vehicle 102 may capture one or more images associated with each of the plurality of neighboring vehicles 106.

An image captured for a neighboring vehicle, from the plurality of neighboring vehicles 106, may include a fiduciary object associated with the neighboring vehicle. The fiduciary object associated with the neighboring vehicle may be an object that is stationary with respect to the neighboring vehicle, such that, the fiduciary object may act as a reference object to detect movement or motion of the neighboring vehicle with reasonable reliability. In other words, the fiduciary object exactly mimics movement of the neighboring vehicle. Thus, movement of the fiduciary object may be used to determine movement of the neighboring vehicle. Examples of the fiduciary objects may include, but are not limited to tail lights of the car vehicle, registration plate of the vehicle, or any other prominent or distinct feature of the neighboring vehicle that is stationary with respect to the neighboring vehicle.

In order to identify the fiduciary object from within the image, the vehicle controlling device 200 may analyze the image based on one or more image tracking and analysis techniques. Based on the analysis of the image, the vehicle controlling device 200 may identify a fiduciary object that is associated with the neighboring vehicle. By way of an example, based on the analysis of the image captured for the neighboring vehicle 106b, the vehicle controlling device 200 may identify the number plate of the neighboring vehicle 106b as the fiduciary object. In an embodiment, the vehicle controlling device 200 may be further configured to create and store a mapping between an identified fiduciary object and a type of neighboring vehicle, such that, for a given type of vehicle a particular fiduciary object may be identified and later tracked. Thus, whenever a vehicle of a particular type or make is identified, the mapping may be accessed to determine a fiduciary object that needs to be identified. By way of an example, for a particular make of a car, tail lights may be identified as fiduciary objects that should be identified for tracking. By way of another example, for a different type of vehicle (for example, a truck or a tractor), bumper lights or a vehicle logo may be identified as fiduciary objects that should be identified for tracking.

At step 404, the vehicle controlling device 200 tracks a position of the fiduciary object associated with each of the one or more neighboring vehicles based on a bounding box surrounding or enclosing the fiduciary object associated with each of the one or more neighboring vehicles. In other words, once the fiduciary object is identified from an image captured for a neighboring vehicle, the fiduciary object may be tracked based on the bounding box enclosing the fiduciary object. Thus, by tracking the position of the fiduciary object, the vehicle controlling device 200 may track position or movement of the neighboring vehicle. In order to track the position of the fiduciary object, the vehicle controlling device 200 may determine a change in position of the fiduciary object with respect to the bounding box. This is further explained in detail in conjunction with FIG. 6.

Thereafter, at step 406, the vehicle controlling device 200 determines a direction-speed vector associated with the vehicle based on direction of motion of the vehicle and speed of the vehicle. In other words, the direction-speed vector may be a resultant of the component of a vector that indicates the direction of motion of the vehicle and a vector that indicates the speed of the vehicle. The vehicle controlling device 200 may store the determined direction-speed vector in the memory 204.

In order to track the position or movement of a neighboring vehicle, the vehicle controlling device 200 may process a bounding box enclosing a fiduciary object identified for the neighboring vehicle along with the direction-speed vector of the vehicle. In an embodiment, the vehicle controlling device 200 may lock the position of the bounding box with respect to the direction-speed vector determined at step 406 for the vehicle. This is further explained in detail in conjunction with FIG. 6.

At step 408, the vehicle controlling device 200 determines trajectory data associated with each of the one or more neighboring vehicles. The trajectory data associated with each of the one or more neighboring vehicles is determined based on one or more of, but not limited to LiDAR, Radar, IR sensing, and/or ultrasonic sensing that may be used in conjunction with V2V and V2I communication protocols. For a neighboring vehicle, the trajectory data may include, but is not limited to one or more of, lane change information associated with a neighboring vehicle, speed information associated with the neighboring vehicle, and vehicle infrastructure data associated with the neighboring vehicle. By way of an example, for the vehicle 102, trajectory data may be determined for each of the plurality of neighboring vehicles 106. Using multiple technologies to determine trajectory data associated with a neighboring vehicle enables accurate and robust estimation of the trajectory data. In an embodiment, based on the trajectory data received for a neighboring vehicle through the V2V or V2I communication protocols, the vehicle controlling device 200 of the vehicle (for example, the vehicle 102) may dynamically determine a predefined coverage radius, such that, the data received from only those neighboring vehicles that lie within the predefined coverage radius so determined, may be considered by the vehicle controlling device 200 for determining the trajectory data. By way of an example, when the road 104 is an expressway, the vehicle 102, based on geolocaton, may define the predefined coverage radius as 500 meters, such that, only those one or more of the plurality of neighboring vehicles 106 that are within the 500 meters coverage radius of the vehicle 102 are considered. The predefined coverage radius may also be adapted based on current speed of the vehicle and/or the type of road that the vehicle is moving on. In an embodiment, when the vehicle is travelling at higher speeds, the predefined coverage radius may be increased. Similarly, when the vehicle is travelling at lower speeds, the predefined coverage radius may be reduced. In continuation of the example given above, when the current speed of the vehicle 102 is above 120 kms/hours, the predefined coverage radius may be shortened to 50 meters. Similar to changing the predefined coverage radius based on vehicle speed, the predefined coverage radius may be changed based on the type of roads as well. For example, on national highways or expressways, the predefined coverage radius may be increased, whereas on state highways, mountainous regions, city roads, the predefined coverage radius may be reduced.

At step 410, the vehicle controlling device 200 correlates the position of the fiduciary object and the trajectory data associated with each of the one or more neighboring vehicles. Based on the trajectory data received for a neighboring vehicle, the vehicle controlling device 200 may associate a first vector with lane change information of the neighboring vehicle, a second vector with speed information of the neighboring vehicle, and a third vector with vehicle infrastructure data associated with all neighboring vehicles. Further, a fourth vector may be associated with the direction-speed vector determined for the vehicle. Thereafter, for each neighboring vehicle, correlation is performed for the first vector, the second vector, the third vector, and the fourth vector. This is further explained in detail in conjunction with FIG. 7.

Based on a result of the correlating, the vehicle controlling device 200, at step 412, re-computes the direction-speed vector of the vehicle (for example, the vehicle 102). At step 414, the vehicle controlling device 200 controls the vehicle based on the re-computed direction-speed vector for the vehicle. Controlling the vehicle may include controlling the speed and the direction of motion of the vehicle. By way of an example, the vehicle controlling device 200 of the vehicle 102 may determine that the neighboring vehicle 106b has made an abrupt lane change, based on a change in lateral position of a fiduciary object associated with the neighboring vehicle 106b and/or trajectory data associated with the neighboring vehicle 106b. The change in lateral position may either be because of an impending obstacle for example, the obstacle 110 or the neighboring vehicle 106b may generally be changing lanes. In either case, based on the correlation described in the step 410, the re-computed direction-speed vector determined for the vehicle 102 would direct the vehicle 102 to gradually change the lane or slow-down in order to avoid an impending obstacle.

By way of another example, the vehicle controlling device 200 of the vehicle 102 may determine that the neighboring vehicles 106a and 106c may be crossing a pothole, a speed bump or an unlevelled portion of the road 104, based on a change in vertical position of fiduciary object associated with the neighboring vehicles 106a and 106c and/or trajectory data associated with the neighboring vehicles 106a and 106c. In either case, based on the correlation described in the step 410, the re-computed direction-speed vector determined for the vehicle 102 would direct the vehicle 102 to change the current lane or gradually slow-down in order to avoid a sudden jerk to passenger within the vehicle 102.

Figure 5:
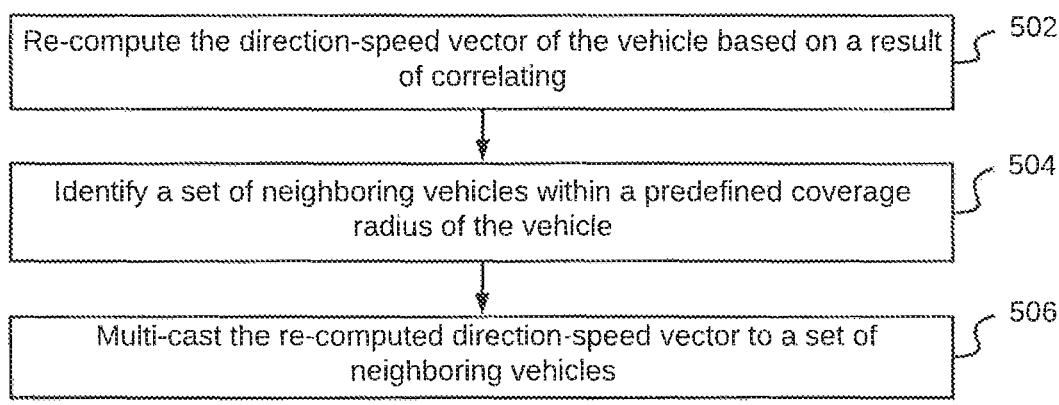
FIG. 5 illustrates a flowchart of a method for multi-casting the re-computed direction-speed vector to a set of neighboring vehicles, in accordance with an embodiment.

Referring now to FIG. 5, a flowchart of a method for multicasting the re-computed direction-speed vector to a set of neighboring vehicles is illustrated, in accordance with an embodiment. At step 502, the direction-speed vector of the vehicle is re-computed based on a result of correlating, as described in FIG. 4. The step of re-computing the direction-speed vector of the vehicle has been explained in detail in conjunction with FIG. 4. At step 504, a set of neighboring vehicles within a predefined coverage radius of the vehicle are identified. The set of neighboring vehicles are identified from the plurality of neighboring vehicles. In an embodiment, the set of neighboring vehicles may include each of the plurality of neighboring vehicles. The predefined coverage radius may vary based on the current location of the vehicle, type of road, and/or current speed of the vehicle.

Thereafter, at step 506, the re-computed direction-speed vector is multi-casted to the set of neighboring vehicles. The re-computed direction-speed vector may be multi-casted using a V2V communication protocol. In an embodiment, the vehicle may preferably multi-cast the re-computed direction-speed vector to neighboring vehicles that are trailing the vehicle. In addition to multi-casting the re-computed direction-speed vector, the vehicle may also multi-cast road condition information regarding location of a pot-hole, a speed bump, an obstacle, an accident prone area, or an unlevelled portion of the road to the set of neighboring vehicles. In an embodiment, this information may be stored or cached in a database on a remote server, which may be accessed by vehicle controlling devices of other vehicles to retrieve such information and control respective vehicles accordingly. In an embodiment, the stored information may be retrieved into the vehicle controlling device 200 of a vehicle automatically when a vehicle is approaching the same stretch of road at later instance. Accordingly, based on the retrieval of such information, the direction-speed vector of the vehicle may be automatically adjusted without it being dependent on any neighboring vehicles. Thus, once the information regarding an obstacle is gathered, the storage of such information can be leveraged for re-use at later points of time thereby allowing the vehicle to be driven safely over the same stretch of road where the aberrations were observed, without relying on neighboring vehicles. In such a scenario, if the vehicle is the first one to encounter the aberrations, it may still be able to evade the aberrations.

Alternatively, or additionally, the vehicle may unicast the re-computed direction-speed vector and the road condition information to an access point using V2I communication protocol. The access point may be located near the road the vehicle is driving on. The access point may further multi-cast the re-computed direction-speed vector and road condition information to other vehicles traversing on the road. In this case, larger number of vehicles may be updated simultaneously.

Figure 6:
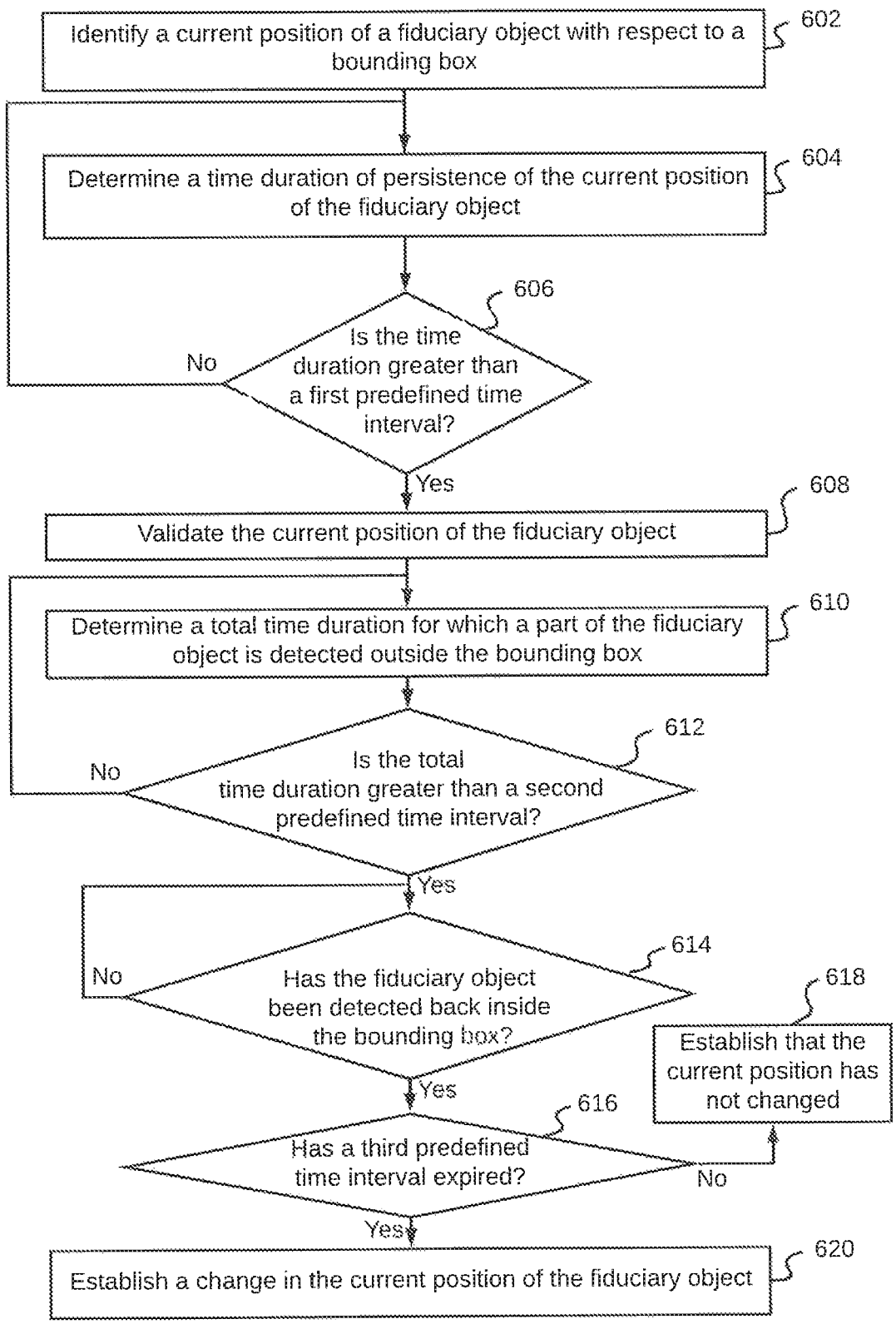
FIG. 6 illustrates a flowchart of a method for tracking the position of a fiduciary object associated with a neighboring vehicle, in accordance with an embodiment.

Referring now to FIG. 6, a flowchart of a method for tracking the position of a fiduciary object associated with a neighboring vehicle is illustrated, in accordance with an embodiment. At step 602, a current position of the fiduciary object associated with the neighboring vehicle is identified with respect to a bounding box enclosing the fiduciary object.

At step 604, a time duration of persistence of the current position of the fiduciary object within the bounding box is determined. At step 606, a check is performed to determine whether the time duration is greater than a first predefined time interval. When the time duration is greater than the first predefined time interval, the current position of the fiduciary object is validated at step 608 and the position of bounding box with respect to the fiduciary object is locked to commence tracking. As a consequence of this, the bounding box will follow the motion of the fiduciary object. In other words, its established that the current position of the fiduciary object is consistent for further analysis.

Thereafter, at step 610, when sudden motion of the vehicle being tracked leads to a sudden variation of fiduciary object with respect to the bounding box, such that for a brief interval, the fiduciary object is detected outside the bounding box, the vehicle controlling device 200 determines a total time duration for which a part of the fiduciary object is detected outside the bounding box.

At step 612, a check is performed to determine whether the total time duration is greater than a second predefined time interval. If the total time duration is less than the second predefined time interval, it is considered that the movement of fiduciary object is not substantial enough to be considered for determination of change in fiduciary object. In an embodiment, the second predefined interval starts from the moment a part of the fiduciary object is detected outside the bounding box.

Upon determination that the total time duration is greater than the second predefined time interval, a check is performed, at step 614, to determine whether the fiduciary object has been detected back inside the bounding box before the expiry of a third time interval. The third predefined interval also starts from the moment a part of the fiduciary object is detected outside the bounding box. Such detection of the fiduciary object within the bounding box in accordance with the aforesaid timeframe is indicative of a change in the current position of the fiduciary object with respect to the bounding box. In an exemplary scenario, such a change may correspond to evasive movements made by the neighboring vehicle in order to evade the aberration or the obstacle, and once the obstacle or aberration has been evaded the neighboring vehicle resumes on the originally followed course on the road. In an embodiment, a change in the current position may include one or more of a lateral position change, or a vertical position change, or a combination of vertical and horizontal position changes of the fiduciary object with respect to the bounding box enclosing the fiduciary object.

In scenario, when the fiduciary object is not detected before the expiry of the third predefined time interval, the vehicle controlling device 200 may interpret this as movement of the neighboring vehicle to change course, such as change of lane, movement uphill, or movement downhill. The control then passes to end step 618.

Figure 7:
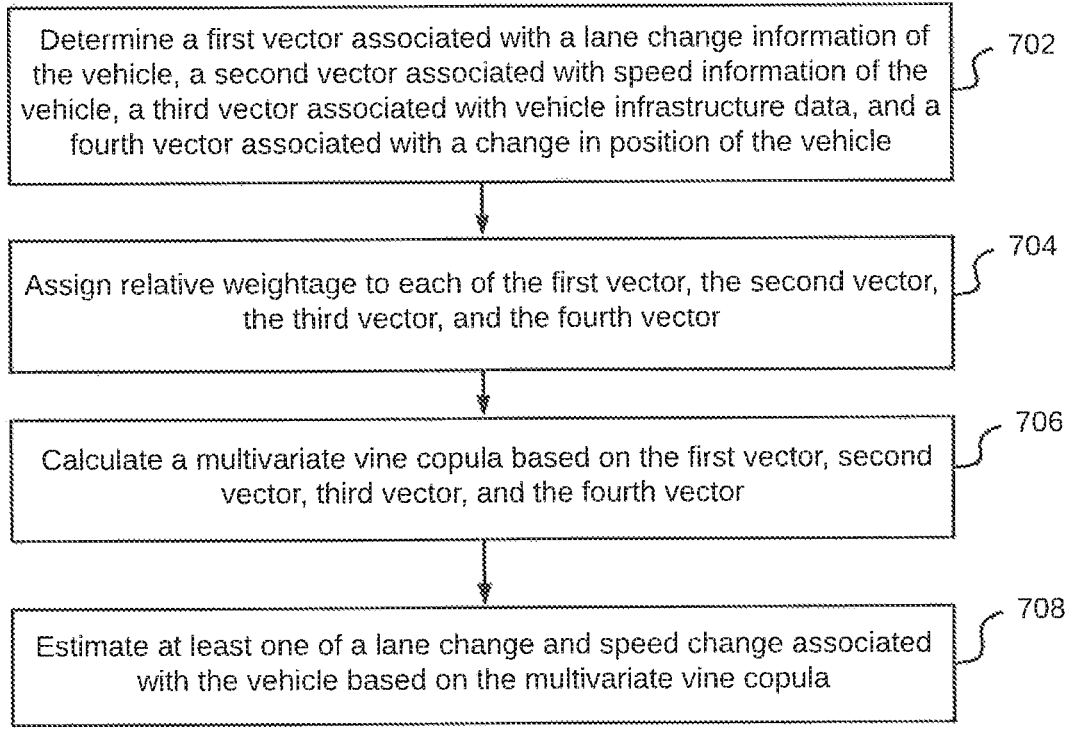
FIG. 7 illustrates a flowchart of a method for correlating the position of a fiduciary object and the trajectory data associated with neighboring vehicles, in accordance with an embodiment.

Referring to FIG. 7 a flowchart of a method for correlating the position of a fiduciary object and the trajectory data associated with neighboring vehicles is illustrated, in accordance with an embodiment. At step 702, a first vector, a second vector, a third vector, and a fourth vector are determined. The first vector may be associated with a lane change information of a neighboring vehicle from the plurality of neighboring vehicles. The second vector may be associated with speed information of the neighboring vehicle. The third vector may be associated with vehicle infrastructure data associated with the plurality of neighboring vehicle. Lastly, the fourth vector is associated with the direction-speed vector of the vehicle.

At step 704, relative weightage is assigned to each of the first vector, the second vector, the third vector, and the fourth vector. A higher weightage is assigned to the first vector as compared to the second vector, when a lateral change in position of the fiduciary object is detected. Additionally, a higher weightage is assigned to the second vector as compared to the first vector, when a vertical change in position of the fiduciary object is detected. Assigning of relative weights enables the vehicle controlling device 200 to make more accurate and informed decision regarding actual events on the road. By way of an example, a lateral position change may be detected when a neighboring vehicle undergoes a sideways motion in order to evade an impending obstacle. In this case, relatively higher weight may be assigned to the second vector, by way of which, the vehicle controlling device 200 indicates that an obstacle may be encountered by the neighboring vehicle. This weighted vector, when correlated with the trajectory data received from each of the one or more neighboring vehicles in the vicinity of the vehicle, may enable the vehicle controlling device 200 to make more accurate estimation about the kind of obstacle or aberration encountered by the neighboring vehicle on the road and consequently enable the vehicle controlling device 200 to determine the most appropriate change in position of the vehicle.

In order to perform the correlations, a multivariate vine copula is calculated, at step 706, based on the first vector, the second vector, the third vector, and the fourth vector. In an embodiment, the multivariate vine copula may be a regular vine, such that, the regular vine includes a plurality of nodes connected by a plurality of edges. While the plurality of nodes represents the first vector, the second vector, the third vector, and the fourth vector, the plurality of edges represent a degree of dependence between each of the plurality of nodes (in other words, the vectors). Thereafter, based on the multivariate vine copula, one or more of a lane change and speed change associated with the vehicle being controlled is estimated at step 708. This is further explained in detail in conjunction with FIGS. 8A, 8B, 8C, and 8D.

Referring now to FIGS. 8A, 8B, 8C, and 8D, determination of change in position of a fiduciary object associated with a neighboring vehicle and subsequent correlation with trajectory data associated with the one or more neighboring vehicles is illustrated, in accordance with an exemplary embodiment. As discussed in detail in FIG. 6, the change in position of a fiduciary object may include a lateral change (for example, caused when the neighboring vehicle changes lane) and a vertical change (for example, caused when the neighboring vehicle encounters a pothole or a bump in the road).

Figure 8A:
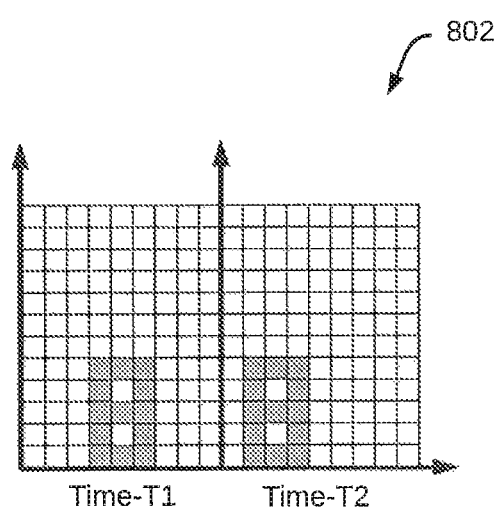
FIGS. 8A, 8B, 8C, and 8D illustrate determination of change in position of a fiduciary object associated with a neighboring vehicle and subsequent correlation with trajectory data associated with neighboring vehicles, in accordance with an exemplary embodiment.
Figure 8B:
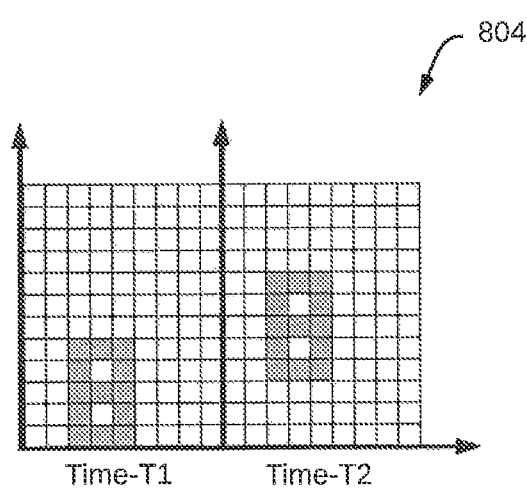

The lateral change in position of a fiduciary object associated with the neighboring vehicle is depicted by 802 in FIG. 8A, while the vertical change in position of the fiduciary object is depicted by 804 in FIG. 8B. 802 and 804 depict current position of the fiduciary object as (X, Y) coordinates, where the X coordinate represents the lateral or horizontal direction, while the Y coordinate represent the vertical direction. It will be apparent to a person skilled in the art that current position of the fiduciary object may also be depicted in the form of (X, Y, Z) coordinates, i.e., a three dimensional representation.

In both 802 and 804, the positon of the fiduciary object is depicted at two time instants, i.e., T1 and T2. To establish whether change in position of the fiduciary object should be considered by the vehicle controlling system 200, the difference between T1 and T2 is compared with a threshold time. This is represented by equation 1 given below:

$$(T2-T1)>Th \qquad 1$$

where,

Th is the threshold time.

When the difference between T2 and T1 is greater than the threshold time, it is established that the change in position of the fiduciary object should be considered by the vehicle controlling device 200. In 802, at T1, the fiduciary object is at coordinates: (4, 0), while at T2, the fiduciary object is at coordinates (2, 0). Thus, the X coordinate of the fiduciary object has changed by a magnitude of −2, thereby indicating that the fiduciary object has undergone a lateral change in positon towards left by a magnitude of 2 units. This may indicate that neighboring vehicle with which the fiduciary object is associated has moved towards left at time T2, either to change a lane or to avoid an impending obstacle. A person of ordinary skill in the art will appreciate that the threshold can be adjusted by adjusting the values for "T1" and "T2" for various kinds of roads. In scenarios, when it is known that the road is bumpy, the value of "T1" can be increased to prevent false positives in detecting changes in the position of the fiduciary object. Also, the value for "T2" can also be increased in this scenario for the reason same as above. Conversely, for good quality roads, the value of "T1" and "T2" can be reduced considering the fact that good quality roads allow for fast movement of traffic, which in turn reduces the reaction time required for controlling a vehicle.

Similarly, in 804, at T1, the fiduciary object is at coordinates: (4, 0), while at T2, the fiduciary object is at coordinates (4, 2). Thus, while the X coordinate of the fiduciary object has not changed, the Y coordinate of the fiduciary object has changed by a magnitude of 2, thereby indicating that the fiduciary object has undergone a vertical change in positon northwards from the original position by a magnitude of 2 units. This may indicate that neighboring vehicle with which the fiduciary object is associated has encountered a bump on the road at time T2, thereby moving the vehicle upwards. Alternatively, had the Y coordinate of the fiduciary object changed by a magnitude of −2, it would have indicated that the neighboring vehicle has encountered a depression or a pothole on the road at time T2.

Once a change in positon of the fiduciary object and thus the neighboring vehicle has been identified and established, four vectors are determined. A first vector, V1, associated with a lane change information of the neighboring vehicle is determined based on lateral and/or vertical change in position of a fiduciary object associated with the neighboring vehicle. A second vector, V2, associated with speed information of the neighboring vehicle is determined. A third vector, V3 associated with vehicle infrastructure data of a plurality of neighboring vehicles is determined, which includes information about lane change, speed change, and/ or trajectory data of the plurality of neighboring vehicles. Lastly, a fourth vector, V4, associated with the direction-speed vector of the vehicle is determined for a given location of the vehicle.

Once the four vectors have been determined, a multivariate vine copula is calculated based on the first vector, the second vector, the third vector, and the fourth vector. A "multivariate dataset" refers to a dataset that includes observations of an m-dimensional variable. For example, "n" observations of m-dimensional variable may constitute a multivariate dataset. For example, trajectory data may include lane change information, speed information and vehicle infrastructure data of one or more neighboring vehicles, where the one or more above parameters correspond to the m-dimensions and the one or more neighboring vehicles correspond to "n" observations. Such trajectory data is an example of the multivariate dataset.

A "copula" refers to a multivariate probability distribution of a multivariate dataset, which may be used to decouple dependencies among the various dimensions of the multivariate dataset. In an embodiment, the copula may be represented as a function of constituent univariate marginal distributions of the various dimensions in the multivariate dataset. In an embodiment, the univariate marginal distributions may be uniformly distributed. In an embodiment, an m-dimensional copula may be represented as a multivariate distribution function C: $[0,1]^m \to [0,1]$. The equation (2) represents a relationship between a joint distribution function F and univariate marginal distributions $F_1(X_1)$, $F_2(X_2)$, ... $F_m(X_m)$ of an m-dimensional multivariate dataset using an m-dimensional Copula function "C":

$$F(X_1, X_2, \ldots X_m) = C(F_1(X_1), F_2(X_2), \ldots F_m(X_m)) \quad (2)$$

Where, $X_i$ is a random variable for the $i^{th}$ dimension of the m-dimensional multivariate dataset (for example, a measure of a physiological parameter in a multivariate healthcare dataset);

$F_i(X_i)$ is a univariate marginal distribution for the $i^{th}$ dimension of the m-dimensional multivariate dataset, where $U_i \leq F_i(X_i)$, where $U_i$ is a cumulative distribution of $X_i$;

F( ) is a joint distribution function of the m-dimensional multivariate dataset; and C( ) is an m-dimensional copula function.

A "joint density function" refers to a joint probability distribution of a multivariate dataset. In an embodiment, the joint density function may represent a probability of assigning values to the various dimensions of the multivariate dataset within a respective range associated with each dimension. In an embodiment, a joint density function f of a m-dimensional multivariate dataset may be expressed in terms of an m-dimensional copula density function $c_{1\ldots m}$ and univariate marginal density functions $f_1, f_2, \ldots f_m$ as represented by equation 3:

$$f(X_1, X_2, \ldots X_m) = c_{1\ldots m}(F_1(X_1), F_2(X_2), \ldots F_m(X_m)) \cdot f_1(X_1) \cdot f_2(X_2) \ldots f_m(X_m) \quad (3)$$

where, f( ) is a joint density function of the m-dimensional multivariate dataset;

$f_i(X_i)$ is a marginal density function of $X_i$; and $c_{1\ldots m}$ is an m-dimensional copula density function, where $$c_{1\ldots m}(F_1(X_1), F_2(X_2), \ldots F_m(X_m)) = \frac{\delta C}{\delta F_1 \delta F_2 \ldots \delta F_m} C(F_1(X_1), F_2(X_2), \ldots F_m(X_m)) \quad (4)$$

In an embodiment, the joint density function f of the m-dimensional multivariate dataset may also be expressed in terms of conditional densities of the random variables as represented by equation 5:

$$f(X_1, X_2, \ldots X_m) = f_m(X_m) \cdot f(X_{m-1}|X_m) \ldots f(X_1|X_2, \ldots X_m) \quad (5)$$

where, $f(X_l|X_{l+1}, \ldots X_{l+j-1})$ is a conditional density of the random variable $X_l$ (for the $l^{th}$ dimension), where $1 \leq l \leq m-1$ and $j = m-l$.

By simplifying the equations 3, 4, and 5, the joint density function f may be expressed in terms of univariate marginal density functions $f_1, f_2, \ldots f_m$ and bivariate copula densities, as represented by equation 6:

$$f(X_1, X_2, \ldots X_m) = \Pi_{k=1}^m f_k(X_k) \Pi_{j=1}^{m-1} \Pi_{l=1}^{m-j} c_{l,l+j|l+1,\ldots l+j-1}(F(X_l|X_{l+1}, \ldots X_{l+j-1}), F(X_{l+j}|X_{l+1}, \ldots X_{l+j-1})) \quad (6)$$

where, $c_{l,l+j|l+1,\ldots l+j-1}$ is a density of a bivariate copula distribution $C_{l,l+j|l+1,\ldots l+j-1}$; and $F(X_l|X_{l+1}, \ldots X_{l+j-1})$ is a conditional cumulative distribution of the random variable $X_l$.

A "bivariate copula distribution" refers to a copula distribution that may model a dependency between a pair of dimensions of a multivariate dataset. Examples of the bivariate copula distribution may include, but are not limited to, a T-student copula distribution, a Clayton copula distribution, a Gumbel copula distribution, or a Gaussian copula distribution. In an embodiment, the bivariate copula distribution may be a part of a D-vine copula distribution.

A "D-vine copula" refers to a hierarchal collection of bivariate copula distributions. In an embodiment, the D-vine copula may be represented graphically by a set of hierarchal trees, each of which may include a set of nodes arranged sequentially and connected by a set of edges. Further, each edge, connecting a pair of nodes in a hierarchal tree, may represent a bivariate copula distribution. In an embodiment, for "m" random variables, the D-vine copula may correspond to a hierarchal structure including m–1 hierarchal trees representing a total of $$\frac{m(m-1)}{2}$$

bivariate copula distributions.

For example, a D-vine copula may be used to represent the bivariate copula distributions of the equation 6. In such a scenario, the variable j in the equation 6 may identify a hierarchal tree of the D-vine copula and the variable l in the equation 6 may identify an edge within that hierarchal tree, for representing each bivariate copula distribution of the equation 6 through the D-vine copula. In an embodiment, the D-vine copula may model a dependency between each pair of dimensions in a multivariate dataset. In an embodiment, the constituent bivariate copula distributions within the D-vine copula model may belong to different families of copula functions. Examples of the various families of copula functions include, but are not limited to, a T-student copula distribution, a Clayton copula distribution, a Gumbel copula distribution, or a Gaussian copula distribution.

An "h-function" refers to a conditional distribution of a random variable in terms of a bivariate copula distribution with known parameters. In an embodiment, the h-function may be used to represent an m-dimensional conditional distribution in terms of a pair of (m–1)-dimensional conditional distributions. Thus, the h-function may be used to recursively evaluate a conditional distribution in terms of individual random variables representing the various dimensions of the original conditional distribution. Equation 7 given below is an example of a conditional cumulative distribution function represented in terms of an h-function:

$$F(X_j \mid X_1, \ldots X_{j-1}) = \tag{7}$$
$$\frac{\delta C_{j,1|2,\ldots j-1}(F(X_j \mid X_2, \ldots X_{j-1}), F(X_1 \mid X_2, \ldots X_{j-1}))}{\delta F(X_1 \mid X_2, \ldots X_{j-1})} =$$
$$h(F(X_j \mid X_2, \ldots X_{j-1}), F(X_1 \mid X_2, \ldots X_{j-1})); \sum_{j,1|2 \ldots j-1}$$

Where, $F(X_j \mid X_1, \ldots X_{j-1})$ is a conditional cumulative distribution of $X_j$;

$C_{j,1|2,\ldots,j-1}$ is a bivariate copula distribution between $j^{th}$ and $1^{st}$ dimensions, conditioned on $2^{nd}, 3^{rd}, \ldots (j-1)^{th}$ parameters;

$\Sigma_{j,1|2\ldots,j-1}$ are parameters of the bivariate copula distribution $C_{j,1|2,\ldots,j-1}$, which may be pre-estimated; and h( ) is the h function.

A person skilled in the art will understand that a conditional cumulative distribution of random variable may be equivalent to a conditional cumulative distribution of the corresponding marginal distribution of the random variable. Hence, an h-function in terms of the random variable may be equivalent to an h-function in terms of the corresponding marginal distribution of the random variable. For instance, $X_1$ and $X_2$ are random variables with corresponding marginal distributions $U_1=F_1(X_1)$ and $U_2=F_2(X_2)$. Then, $F(U_1 \mid U_2)=F(X_1 \mid X_2)=h(X_1,X_2)=h(U_1,U_2)$.

A "cumulative distribution" refers to a distribution function, that describes the probability that a real-valued random variable X with a given probability distribution will be found at a value less than or equal to x. A "marginal cumulative distribution" refers to a cumulative distribution of a random variable representing a single dimension of a multivariate dataset. For example, X is a random variable representing an $i^{th}$ dimension of the multivariate dataset. The marginal cumulative distribution of $X_i$ may be represented as $F_i(X_i)$ or $U_i$. A "conditional cumulative distribution" refers to a multivariate cumulative distribution of multiple random variables, which is conditioned on at least one of the random variable. For example, $F(X_3 \mid X_2, X_1)$ is a three dimensional conditional cumulative distribution of random variables $X_1, X_2,$ and $X_3$ such that the marginal cumulative distribution of the random variable $X_3$ may be conditioned on the marginal cumulative distributions of the random variables $X_1$ and $X_2$.

An "inverse cumulative distribution" refers to an inverse function of the cumulative distribution of the random variable X. "Probability" shall be broadly construed, to include any calculation of probability; approximation of probability, using any type of input data, regardless of precision or lack of precision; any number, either calculated or predetermined, that simulates a probability; or any method step having an effect of using or finding some data having some relation to a probability. A "random variable" refers to a variable that may be assigned a value probabilistically or stochastically. "Expectation Maximization (EM) algorithm" refers to a statistical technique of determining a maximum likelihood estimate of one or more parameters of a distribution, where the distribution depends on unobserved latent variables.

With reference to the explanation given above, in this exemplary embodiment, a four dimensional regular vine, which is a sequence of trees is used. The number of trees in the sequence is determined based on equation 8:

$$(D-1) \tag{8}$$

where,

D is the number of nodes

Figure 8C:
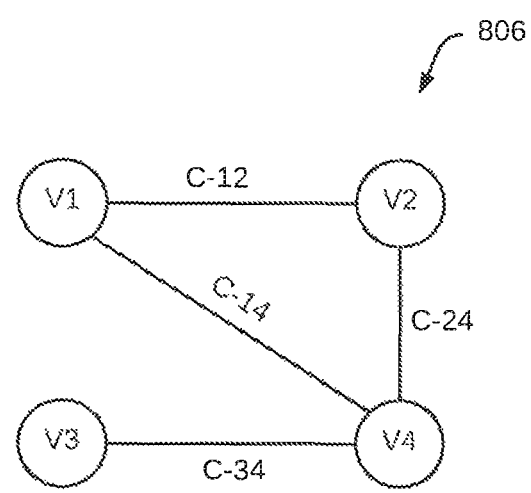

Since four vectors have been determined, D has a value of four. Thus, the four dimensional regular vine would have three trees. A vine structure 806 in FIG. 8C depicts the vine structure for the four dimensional regular vine. The vine structure 806 has four nodes, i.e., V1, V2, V3, and V4, each of which have been explained above. This vine structure 806 includes four vine copula pairs, i.e., C-12, C-14, C-24, and C-34. The vine copula may be determined based on a bi-variate copula function, which is a distribution of, trajectory data for each of the plurality of neighboring vehicles with uniform marginal. The bi-variate copula may be represented by equation 9 given below:

$$C:[0,1]^2 \tag{9}$$

Figure 8D:
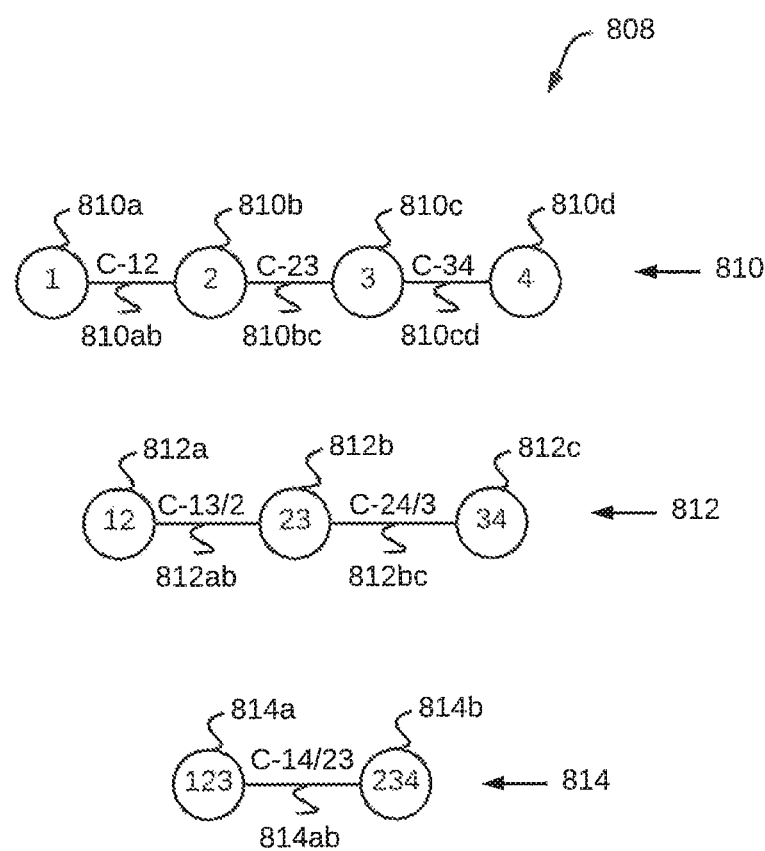

A D-vine copula 808 for the vine structure 806 is depicted in FIG. 8D. The D-vine copula 808 corresponds to a scenario in which the multivariate data includes four vectors, i.e., V1, V2, V3, and V4. Thus, as shown in FIG. 8D, the D-vine copula 808 may include three hierarchal trees (i.e., m–1 hierarchal tree, where m is the number of vectors), i.e., a tree 810, a tree 812, and a tree 814.

A hierarchal tree at a particular level of the D-vine copula 808 may include, a sequence of connected nodes. In an embodiment, the tree 810, at the first level of the D-vine copula 808, may represent the various vectors in the multivariate data. Thus, the number of nodes at the first level may be same as the number of the parameters that indicate lane change information, speed information, vehicle infrastructure data, and direction-speed information. Further, the tree 810 may represent bivariate copula distributions between pairs of each above mentioned parameters.

In an embodiment, trees at each subsequent level, i.e. the tree 812 and the tree 814, may represent bivariate copula distributions of the preceding level and conditional bivariate copula distributions determined based on such bivariate copula distributions of the preceding level. For instance, the tree 810 includes four nodes 810a-810d representing the four vectors V1, V2, V3, and V4 respectively. The nodes 810a-810d are sequentially connected by edges 810ab, 810bc, and 810cd respectively. Each edge represents a bivariate copula distribution between the respective vectors. For example, as shown in FIG. 8D, the edge 810ab connects the node 810a (representing V1) and the node 810b (representing V2). Thus, the edge 810ab may represent the bivariate copula $C_{12}$. Similarly, the edge 810bc may represent the bivariate copula $C_{23}$ and the edge 810cd may represent the bivariate copula $C_{34}$.

Further, the tree 812 at the level 2 of the D-vine copula 808 includes three nodes, i.e., nodes 812a, 812b, and 812c. Each of the three nodes (i.e., 812a-812c) may represent a corresponding bivariate copula represented at the previous level. For instance, as shown in FIG. 8D, the node 812a at the level 2 may correspond to the edge 810ab of the level 1. Similarly, the node 812b at the level 2 may correspond to the edge 810bc of the level 1 and the node 812c at the level 2 may correspond to the edge 810cd of the level 1. Hence, the node 812a may denote the bivariate copula C12, which is represented by the corresponding edge 810ab of the previous level, i.e., the level 1. Similarly, the node 812b may denote the bivariate copula $C_{23}$, which is represented by the corresponding edge 810bc of the level 1 and the node 812c may denote the bivariate copula $C_{34}$, which is represented by the corresponding edge 810cd of the level 1.

Further, the nodes 812a-812c, at the level 2 of the D-vine copula 808, may be sequentially connected by edges 812ab and 812bc, respectively. Each edge between a pair of nodes at the level 2 may represent a conditional bivariate copula, which may be determined based on the pair of bivariate copulas, represented by the pair of nodes. For instance, the edge 812ab connects the node 812a (representing $C_{12}$) and the node 812b (representing $C_{23}$). Thus, the edge 812ab may represent the conditional bivariate copula $C_{13|2}$, Similarly, the edge 812bc, connecting the nodes 812b and 812c (representing $C_{23}$ and $C_{34}$, respectively), ay represent the conditional bivariate copula $C_{24|3}$.

In addition, the tree 814 at the level 3 of the D-vine copula 808 includes two nodes, i.e., a node 814a and 814b. The node 814a may correspond to the edge 812ab of the previous level, i.e., the level 2. Further, the node 814b may correspond to the edge 812bc of the level 2. Hence, the node 814a may denote the conditional bivariate copula $C_{13|2}$, which is represented by the corresponding edge 812ab. Similarly, the node 814b may denote the conditional bivariate copula $C_{24|3}$, which is represented by the corresponding edge $812_{bc}$. Further, the nodes 814a and 814b may be connected by an edge 814ab. The edge 814ab may represent the conditional bivariate copula $C_{14|3,2}$, which may be determined based on the conditional bivariate copulas $C_{13|2}$ and $C_{24|3}$ (denoted by the nodes 814a and 814b respectively).

Further, in an embodiment, the individual bivariate copulas in the D-vine copula 808 may include, but are not limited to, a T-student copula distribution, a Clayton copula distribution, a Gumbel copula distribution, or a Gaussian copula distribution. A person skilled in the art will understand that though the D-vine copula 808 has been illustrated for an example scenario of four vectors as explained in the instant application, the D-vine copula 808 may be similarly extended for any number of vectors. In an embodiment, the number of levels of the D-vine copula 808 may be given by m−1 and the number of bivariate copulas represented by the D-vine copula 808 may be given by m(m−1)/2, where m: number of vectors.

Thereafter, copula densities may be computed as a function of each of the first vector, the second vector, the third vector, and the fourth vector, represent by equation 10 given below:

$$\text{Copula Densities}=F(V1,V2,V3,V4) \quad (10)$$

The overall copula density may be computed based on the equations 11, 12, and 13 given below:

$$\text{Copula Density}=F(\text{Copular Pair Densities}\times\text{Marginal Densities}) \quad (11)$$

$$\text{Marginal Densities}=F4(V4)\cdot F3(V3)\cdot F2(V2)\cdot F1(V1) \quad (12)$$

$$\begin{aligned}\text{Copular Pair Densities}=&\{C\text{-}12[F1(V1),F2(V2)]\cdot C\text{-}23\\&[F2(V2),F3(V3)]\cdot C\text{-}34[F3(V3),F4(V4)]\}*\{C\text{-}\\&13|2[F1|2(V1|V2),F3|2(V3|V2)]\cdot C24|3[F2|3\\&(X2|X3),F4|3(X4|X3)]\}*\{C14|23[F1|23(V2|V3),\\&F4|23(V2|V3)]\}\end{aligned} \quad (13)$$

A correlation model as depicted by equation 14 is then determined:

Tree for the vine structure+Copula Density+Copula Parameters (14)

Thereafter, a bivariate maximum likelihood estimation of the correlation model given by equation 14 is performed to determine direction of the vehicle and the speed of the vehicle.

Figure 9:
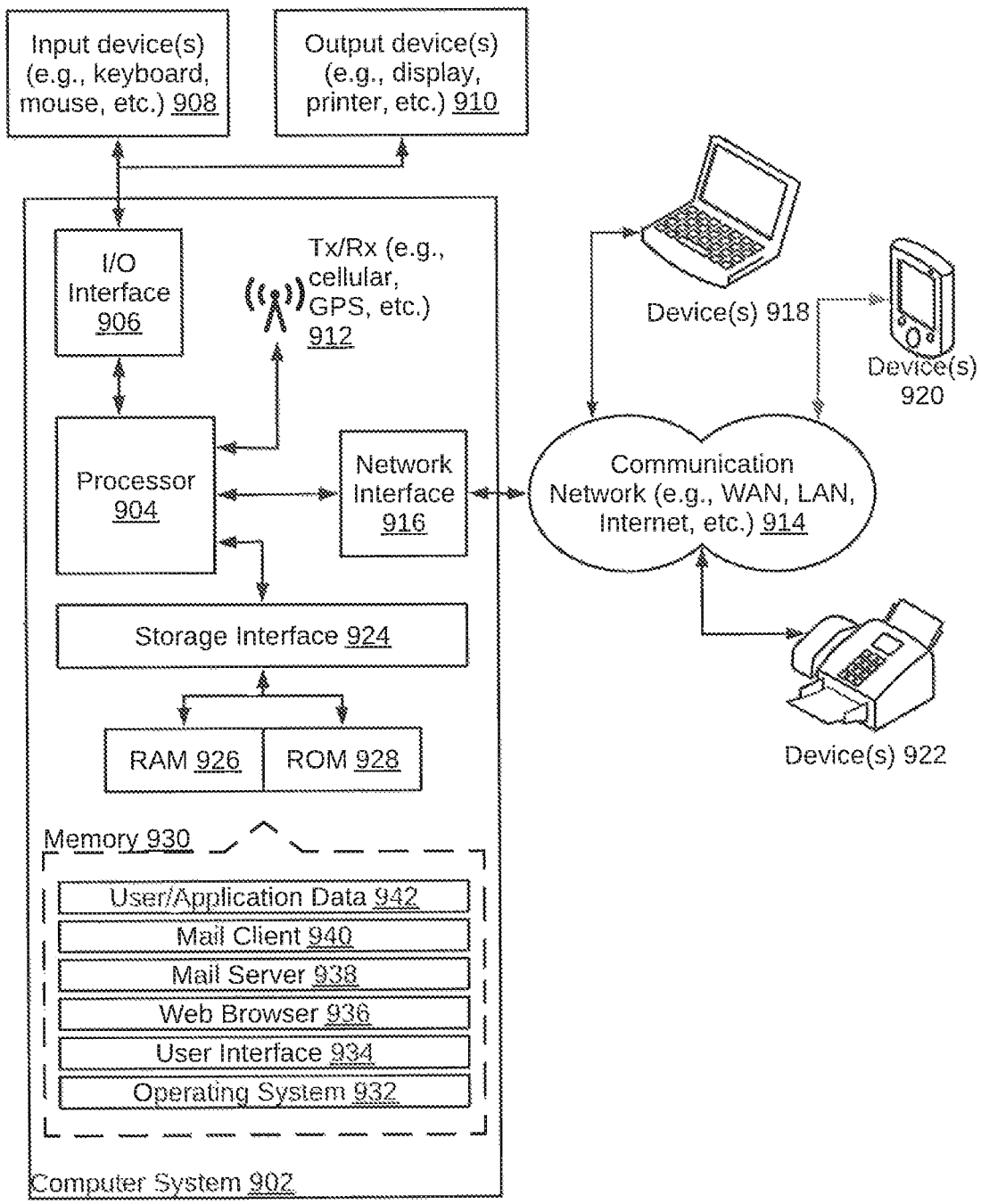
FIG. 9 illustrates a block diagram of an exemplary computer system for implementing various embodiments.

FIG. 9 is a block diagram of an exemplary computer system for implementing various embodiments. Computer system 902 may include a central processing unit ("CPU" or "processor") 904. Processor 904 may include at least one data processor for executing program components for executing user- or system-generated requests. A user may include a person, a person using a device such as such as those included in this disclosure, or such a device itself. Processor 904 may include specialized processing units such as integrated system (bus) controllers, memory management control units, floating point units, graphics processing units, digital signal processing units, etc. Processor 904 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 910 may be a printer, fax machine, video display (e.g., cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 918-PMB9800® transceiver, or the like), providing IEEE 802.11a/b/g/n, Bluetooth, FM, global positioning system (GPS), 2G/3G HSDPA/HSUPA communications, etc.

In some embodiments, processor 904 may be disposed in communication with a communication network 914 via a network interface 916. Network interface 916 may communicate with communication network 914. Network interface 916 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 914 may include, without limitation, a direct interconnection, local area network (LAN), wide area network (WAN), wireless network (e.g., using Wireless Application Protocol), the Internet, etc. Using network interface 916 and communication network 914, computer system 902 may communicate with devices 918, 920, and 922. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of these devices.

In some embodiments, processor 904 may be disposed in communication with one or more memory devices (e.g., RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, user interface application 934, web browser 936, mail server 938, mail client 940, user/application data 942 (e.g., any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces may provide computer interaction interface elements on a display system operatively connected to computer system 902, such as cursors, icons, check boxes, menus, scrollers, windows, widgets, etc. Graphical User Interfaces (GUIs) may be employed, including, without limitation, Apple® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL). Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for controlling a vehicle based on neighboring vehicles. The disclosed embodiments encompass numerous advantages. The disclosure leads to an effective clustering of a multivariate dataset using a D-vine copula distribution model. For example, the multivariate dataset may be a vehicle infrastructure dataset. By using the D-vine copula, the direction-speed vector may be computed. The D-vine copula, though a very robust method for clustering data of a numerical data type, may be inefficient while handling data of a categorical data type. Further, the D-vine copula may not perform well in case of missing values in the multivariate dataset. In addition, the sampling of latent variables for determining the D-vine copula may be a non-trivial task. The disclosure overcomes the aforementioned shortcomings of the D-vine copula for clustering the multivariate dataset and determination of complex dependencies within the multivariate dataset to accurately correlate all the vectors and efficiently compute the direction speed vector of the vehicle to be computed. As a result, the method provides for efficient vehicle control in autonomous and semi-autonomous vehicles and assistance in case of non-autonomous vehicle, thereby, making the vehicles are less prone to accidents.

The claimed steps as discussed above are not routine, conventional, or well understood in the art, as the claimed steps enable the following solutions to the existing problems in conventional technologies. In order to efficiently and effectively control a vehicle, the conventional technologies do not take into account information regarding various abnormalities or aberrations on the road, for example, the levelling or unevenness of the road, potholes on the road, stationary obstacles, or obstacles that suddenly appear, for example, an obstruction due to a landslide or a fallen tree. The provided method identifies and tracks change in positon of a neighboring vehicle by capturing an image and identifying a fiduciary object from the captured image. The fiduciary object is later tracked with respect to a bounding box enclosing the fiduciary object in order to detect change in position of the neighboring vehicle. Additionally, trajectory data associated with multiple neighboring vehicles is determined by using a combination of multiple technologies, which enables accurate and robust estimation of the trajectory data. The method further provides correlating the information regarding change in positon of the fiduciary object, the trajectory data, and the direction-speed vector. This enables more accurate estimation about the kind of abnormality or aberration encountered by the neighboring vehicle. Consequently, the most appropriate change in position of the vehicle is zeroed on in order to evade the abnormality and thus the method and device provide the passengers inside the vehicle with a good driving experience.

The specification has described method and device for controlling a vehicle based on neighboring vehicles. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for controlling a vehicle based on neighboring vehicles, the method comprising:
   identifying, by a vehicle controlling device, a fiduciary object associated with each of at least one neighboring vehicle based on at least one image captured for the at least one neighboring vehicle;
   tracking, by the vehicle controlling device, a position of the fiduciary object associated with each of the at least one neighboring vehicle based on a bounding box surrounding the fiduciary object associated with each of the at least one neighboring vehicle In the at least one image;
   determining, by the vehicle controlling device, a direction-speed vector associated with the vehicle based on direction of motion of the vehicle and speed of the vehicle;
   determining, by the vehicle controlling device, trajectory data associated with each of the at least one neighboring vehicle;
   correlating, by the vehicle controlling device, the position of the fiduciary object and the trajectory data associated with each of the at least one neighboring vehicle;
   re-computing, by the vehicle controlling device, the direction-speed vector of the vehicle based on a result of correlating; and
   controlling, by the vehicle controlling device, the vehicle based on the recomputed direction-speed vector.

2. The method of claim 1, wherein tracking the position of the fiduciary object associated with a neighboring vehicle from the at least one neighboring vehicle comprises:
   identifying a current position of the fiduciary object with respect to the bounding box;
   determining a time duration of persistence of the current position of the fiduciary object; and
   validating the current position, when the time duration is greater than a first predefined time interval.

3. The method of claim 2 further comprising:
   establishing a change in the current position, when the time duration for which a portion of the fiduciary object is detected outside the bounding box is greater than a second predefined time interval and the fiduciary object is detected back in the bounding box before an expiry of a third predefined time interval.

4. The method of claim 3, wherein the change in the current position comprises at least one of a lateral position change and a vertical position change.

5. The method of claim 1, wherein the trajectory data associated with a neighboring vehicle from the at least one neighboring vehicle is communicated to the vehicle through at least one of: Vehicle to Vehicle communication protocol and Vehicle to Infrastructure communication protocol.

6. The method of claim 1 further comprising muiticasting the re-computed direction-speed vector to a set of neighboring vehicles from a plurality of neighboring vehicles, wherein the set of neighboring vehicles is within a pre-defined coverage radius of the vehicle.

7. The method of claim 1, wherein controlling the vehicle comprises controlling speed of the vehicle and the direction of motion of the vehicle.

8. The method of claim 1 further comprising determining a first vector associated with a lane change information of the at least one neighboring vehicle from a plurality of neighboring vehicles, a second vector associated with speed information of the at least one neighboring vehicle, a third vector associated with vehicle infrastructure data associated with the plurality of neighboring vehicles, and a fourth vector associated with a change in position of the vehicle.

9. The method of claim 8 further comprising assigning relative weightage to each of the first vector, the second vector, the third vector, and the fourth vector, wherein a higher weightage is assigned to the first vector as compared to the second vector when a lateral change in the position of the fiduciary object is detected, and wherein a higher weightage is assigned to the second vector as compared to the first vector when a vertical change in the position of the fiduciary object is detected.

10. The method of claim 9, wherein correlating the position of the fiduciary object and the trajectory data comprises:
calculating a multivariate vine copula based on the first vector, the second vector, the third vector, and the fourth vector, wherein the multivariate vine copula is a regular vine, wherein the regular vine comprises a plurality of nodes connected by a plurality of edges, wherein the plurality of nodes correspond to the first vector, the second vector, the third vector, and the fourth vector, and the plurality of edges represent a degree of dependence between each of the plurality of nodes; and
estimating at least one of a lane change and speed change associated with the vehicle based on the multivariate vine copula.

11. A vehicle controlling device for controlling a vehicle based on neighboring vehicles, the vehicle controlling device comprising: a processor; and a memory communicatively coupled to the processor, at least one first camera, and at least one second camera, wherein the memory stores processor instructions, which, on execution, causes the processor to:
identify a fiduciary object associated with each of at least one neighboring vehicle based on at least one image captured for the at least one neighboring vehicle;
track a position of the fiduciary object associated with each of the at least one neighboring vehicle based on a bounding box surrounding the fiduciary object associated with each of the at least one neighboring vehicle in the at least one image;
determine a direction-speed vector associated with the vehicle based on direction of motion of the vehicle and speed of the vehicle;
determine trajectory data associated with each of the at least one neighboring vehicle;
correlate the position of the fiduciary object and the trajectory data associated with each of the at least one neighboring vehicle;
re-compute the direction-speed vector of the vehicle based on a result of correlating; and
control the vehicle based on the re-computed direction-speed vector.

12. The vehicle controlling device of claim 11, wherein to track the position of the fiduciary object associated with a neighboring vehicle from the at least one neighboring vehicle, the processor instructions further cause the processor to:
identify a current position of the fiduciary object with respect to the bounding box;
determine a time duration of persistence of the current position of the fiduciary object; and
validate the current position, when the time duration is greater than a first predefined time interval.

13. The vehicle controlling device of claim 12, wherein the processor instructions further cause the processor to establish a change in the current position, when the time duration for which a portion of the fiduciary object is detected outside the bounding box is greater than a second predefined time interval and the fiduciary object is detected back in the bounding box before an expiry of a third predefined time interval.

14. The vehicle controlling device of claim 11, wherein the processor instructions further cause the processor to multicast the re-computed direction-speed vector to a set of neighboring vehicles from a plurality of neighboring vehicles, wherein the set of neighboring vehicles is within a pre-defined coverage radius of the vehicle.

15. The vehicle controlling device of claim 11, wherein controlling the vehicle comprises controlling speed of the vehicle and the direction of motion of the vehicle.

16. The vehicle controlling device of claim 11, wherein the processor instructions further cause the processor to determine a first vector associated with a lane change information of the at least one neighboring vehicle from a plurality of neighboring vehicles, a second vector associated with speed information of the at least one neighboring vehicle, a third vector associated with vehicle infrastructure data associated with the plurality of neighboring vehicles, and a fourth vector associated with a change in position of the vehicle.

17. The vehicle controlling device of claim 16, wherein the processor instructions further cause the processor to assign relative weightage to each of the first vector, the second vector, the third vector, and the fourth vector, wherein a higher weightage is assigned to the first vector as compared to the second vector when a lateral change in position of the fiduciary object is detected, and wherein a higher weightage is assigned to the second vector as compared to the first vector when a vertical change in the position of the fiduciary object is detected.

18. The vehicle controlling device of claim 17, wherein to correlate the position of the fiduciary object and the trajectory data, the processor instructions further causes the processor to:
calculate a multivariate vine copula based on the first vector, the second vector, the third vector, and the fourth vector, wherein the multivariate vine copula is a regular vine, wherein the regular vine comprises a plurality of nodes connected by a plurality of edges, wherein the plurality of nodes correspond to the first vector, the second vector, the third vector, and the fourth vector, and the plurality of edges represent a degree of dependence between each of the plurality of nodes; and estimate at least one of a lane change and speed change associated with the vehicle based on the multivariate vine copula.

19. A non-transitory computer-readable storage medium having stored thereon, a set of computer-executable instructions causing a computer comprising one or more processors to perform steps comprising:

identify a fiduciary object associated with each of at least one neighboring vehicle based on at least one image captured for the at least one neighboring vehicle;

track a position of the fiduciary object associated with each of the at least one neighboring vehicle based on a bounding box surrounding the fiduciary object associated with each of the at least one neighboring vehicle in the at least one image;

determine a direction-speed vector associated with a vehicle based on direction of motion of the vehicle and speed of the vehicle;

determine trajectory data associated with each of the at least one neighboring vehicle;

correlate the position of the fiduciary object and the trajectory data associated with each of the at least one neighboring vehicle;

re-compute the direction-speed vector of the vehicle based on a result of correlating; and control the vehicle based on the re-computed direction-speed vector.

\* \* \* \* \*